United States Patent [19]

Battice et al.

[11] Patent Number: 5,767,192

[45] Date of Patent: Jun. 16, 1998

[54] SILICONE FOAM CONTROL AGENTS FOR HYDROCARBON LIQUIDS

[75] Inventors: David Robert Battice; Kenneth Christopher Fey, both of Midland; Lenin James Petroff, Bay City; Michael Allen Stanga, Midland, all of Mich.

[73] Assignee: Dow Corning Corporation, Midland, Mich.

[21] Appl. No.: 584,505

[22] Filed: Jan. 11, 1996

[51] Int. Cl.$^6$ ............................ C08K 5/07; C10L 1/28
[52] U.S. Cl. ............ 524/770; 524/773; 524/755; 524/775; 524/792; 524/793; 252/321; 252/8.05; 44/320; 528/25
[58] Field of Search ............... 528/25; 524/770, 524/773, 755, 775, 792, 793; 252/321, 8.05; 44/320

[56] References Cited

U.S. PATENT DOCUMENTS

| | | | |
|---|---|---|---|
| 3,233,986 | 2/1966 | Morehouse | 44/76 |
| 4,690,688 | 9/1987 | Adams et al. | 44/76 |
| 4,711,714 | 12/1987 | Callaghan et al. | 208/348 |
| 5,296,625 | 3/1994 | O'Lenick, Jr. et al. | 556/437 |
| 5,397,367 | 3/1995 | Fey et al. | 44/320 |

FOREIGN PATENT DOCUMENTS

| | | | |
|---|---|---|---|
| 4032006 | 10/1990 | Germany | C08G 77/38 |
| 4343235 | 12/1993 | Germany | C08G 77/46 |
| 4325359 | 2/1995 | Germany | C07F 7/18 |

*Primary Examiner*—Karen A. Dean
*Attorney, Agent, or Firm*—Timothy J. Troy

[57] ABSTRACT

The present invention relates to an organopolysiloxane compound having at least one group having the formula

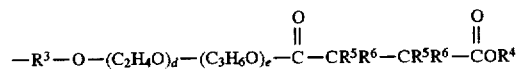

wherein $R^3$ is a divalent hydrocarbon group having from 1 to 20 carbon atoms. $R^5$ and $R^6$ are selected from a hydrogen atom or a group having the formula $-(C_nH_{2n+1})$ where n has a value from 1 to 30. $R^4$ is selected from a hydrogen atom, an alkyl group, or an aryl group. d has a value from 0 to 150, and e has a value from 0 to 150, with the proviso that the value of d+e is greater than zero. The organopolysiloxane compounds of this invention reduce the amount of foam in hydrocarbon fuel, especially in diesel fuels and jet fuels. The organopolysiloxane compounds act as foam control agents which display consistent compatibility and miscibility with additives which are frequently present in hydrocarbon fuels.

14 Claims, No Drawings

SILICONE FOAM CONTROL AGENTS FOR HYDROCARBON LIQUIDS

BACKGROUND OF THE INVENTION

This invention relates to silicone compounds which are useful as foam control agents in foaming systems. More particularly this invention relates to succinic anhydride modified silicone polyethers and to their use as foam control agents in hydrocarbon liquids.

Current fuels exhibit foaming during transfer operations, such as filling a vehicle's fuel tank at a filling station. In the processing, transportation and storage of hydrocarbon liquids, it is frequently observed that foaming occurs as the liquid is passed from one vessel to another. For example, as liquid hydrocarbon fuel is passed quickly into a storage tank a foam may develop at the surface of the fuel and, in many cases, the extent of foaming is sufficiently significant and persistent to require a reduction in the rate of passage of the liquid fuel into the vessel. It is highly desirable to provide means for controlling foaming so as to permit high rates of passage.

There are a number of patents which disclose compositions which reduce or eliminate foam in hydrocarbon liquids. For example Moorehouse et al. in U.S. Pat. No. 3,233,986 discloses siloxane polyoxyalkylene block copolymers having groups represented by the formula $R_bSiO_{4-b_2}$ wherein R is a monovalent hydrocarbon group or a divalent hydrocarbon group and b has a value from 1 to 3 inclusive, and groups having the formula

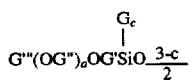

or having the formula

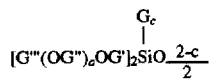

wherein G''' is a member selected from the group consisting of the hydrogen atom and the monovalent hydrocarbon groups, G'' is an alkylene radical containing at least two carbon atoms, G' is a divalent hydrocarbon radical, G is a monovalent hydrocarbon radical, and c has a value from 0 to 2 inclusive. Moorehouse et al. discloses that these siloxane polyoxyalkylene block copolymers are useful in reducing the tendency of various hydrocarbon liquids such as kerosene, gasoline, or diesel fuel to foam.

Adams et al in U.S. Pat. No. 4,690,668 discloses a method of controlling foaming of liquid hydrocarbon fuels such as diesel fuel and jet fuel by inclusion therein of certain siloxane polyoxyalkylene copolymers as antifoam agents. Adams et al. further discloses that the copolymers have an average molecular formula such that the oxyalkylene groups of the copolymer provide from about 25% to about 65% by weight of the copolymer.

Callaghan et al. in U.S. Pat. No. 4,711,714 discloses water-insoluble siloxane polyoxyalkylene graft copolymers which are effective antifoam agents for reducing foaming in crude oil/gas separators. Callaghan et al. discloses that the copolymers are particularly useful in breaking microgas dispersions and foams resulting from crude oils with a high gas to oil ratio.

German Patent Specification No. 4032006 discloses a process for defoaming and/or degassing organic systems by adding to the organic system an antifoaming agent containing an organopolysiloxane having siloxane units of the formula $R_aSiO_{4-a_2}$ and $R_bA_cSiO_{4-(b+c)_2}$ where R is a monovalent hydrocarbon radical having 1 to 18 carbon atoms per radical and A denotes a radical the general formula

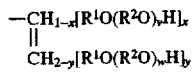

where $R^1$ denotes a radical of the formula —$CR^3H$— with $R^3$ being a hydrogen atom or a monovalent organic radical, $R^2$ denotes a radical of the formula —$CR^4H$—$CH_2$— or —$CH_2CH_2CH_2$— where $R^4$ denotes a hydrogen atom or a monovalent organic radical, v and w at any given time are 0 or a whole number and the sum of v+w on average is 0 to 16, x and y at any given time are 0 or 1 and the sum of x+y is 1 or 2, a is 1–3, b is 0–2, and c is 1 or 2 and the sum of b+c is not greater than 3. It is further disclosed that these organopolysiloxanes are especially useful as foam suppressants or degassing agents in diesel oils, jet fuels, and crude oils.

German Patent Specification No. 4325359 discloses a process for defoaming and/or degassing organic systems by adding to the organic system an antifoaming agent containing an organopolysiloxane having siloxane units of the formula $R_aA_bSiO_{4-a-b_2}$ where R is an SiC bound monovalent hydrocarbon radical having 1 to 18 carbon atoms per radical and A denotes a radical the general formula

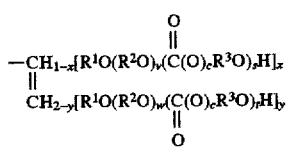

where $R^1$ denotes a divalent hydrocarbon radical having 1 to 6 carbon atoms, $R^2$ denotes a divalent hydrocarbon radical having 2 to 4 carbon atoms, $R^3$ denotes a divalent hydrocarbon radical having 2 to 6 carbon atoms, c, x, and y are 0 or 1, v, w, s, and t are 0 or an integer such that v+w is 0 to 16, s+t is 1–20, x+y is 1 or 2, a is 1–3, b is 0–2, and a+b is 3 or less. It is further disclosed that these organopolysiloxanes are especially useful as foam suppressants or degassing agents in diesel oils, jet fuels, and crude oils.

German Patent Specification No. 4343235 discloses organofunctional polysiloxanes having a mixture of radicals, the first radical being selected from (a) the radical

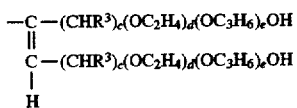

wherein $R^3$ is hydrogen or an alkyl radical, c is a number from 1 to 20, d is a number from 0 to 50, and e is a number from 0 to 50, (b) the radical —$(CH_2)_fOR^4$ where $R^4$ is hydrogen or a monovalent organic radical and f is a number from 3 to 20, and (c) the radical —$(CH^2)_g(OC_2H_4)_h(OC_3H_6)_iOR^5$ where $R^5$ is hydrogen or a monovalent organic radical, g is a number from 3 to 6, h is a number from 1 to 50, and i is a number from 0 to 20, and the second radical being selected from (d) the radical

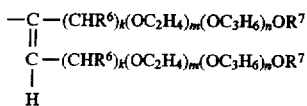

where $R^6$ is a hydrocarbon radical or an alkyl radical, $R^7$ is an alkyl radical, an acyl radical, or a trialkylsilyl radical, k is a number from 1 to 20, m is a number 0 to 50, and n is a number from 0 to 50, (e) the radical $-(CH_2)_oCH_3$ where o is a number from 5 to 30, or (f) the radical $-(CH_2)_g(OC_2H_4)_h(OC_3H_6)_iOR^5$ where $R^5$ is hydrogen or a monovalent organic radical, g is a number from 3 to 6, h is a number from 0 to 35, and i is a number from 1 to 50. These organopolysiloxanes are disclosed as being useful for defoaming diesel fuel in amounts of 0.5 to 50 ppm with respect to diesel fuel.

Fey et al. in U.S. Pat. No. 5,397,367 discloses organosilicon materials that are density matched to the hydrocarbon medium and also act as foam control agents in hydrocarbon fuel, specifically as described therein for diesel fuel. These new foam control agents are disclosed as being crosslinked organopolysiloxane-polyoxyalkylene polymers. Fey et al. further discloses that these polymers have the characteristic of being slightly soluble or insoluble in water and hydrocarbon fuels.

O'Lenick, Jr. et al. in U.S. Pat. No. 5,296,625 discloses novel silicone alkoxylated esters which contain terminal carboxyl groups which provide unique solubility in many organic solvents as well as very substantive salts of the carboxylic acid when neutralized with base. However, nowhere in O'Lenick, Jr. et al. are the particular organopolysiloxanes of this invention taught and furthermore nowhere are the organopolysiloxanes of O'Lenick, Jr. et al. taught as being useful in hydrocarbon fuels as foam control agents.

The use of conventional silicone polyethers, which because of their higher density relative to hydrocarbon fuel can settle out of the fuel over time, potentially renders them less effective without periodic agitation to re-disperse them. Conventional silicone polyethers also can suffer from the fact that they tend to be more soluble or dispersible in water, a constant component of hydrocarbon fuels. In storage tanks, water tends to coalesce, forming a layer at the bottom of the tank. As the silicone polyether settles due to gravity and its insolubility in the hydrocarbon, eventual contact with the water layer can result in its being absorbed into or complexed as a result of its surfactancy with that phase, thus irreversibly removing it from the fuel entirely.

A number of proposals have been made for controlling foaming of various grades of hydrocarbon liquids by use of additives: for example, silicone products as described above. However, the reduction of foaming in diesel fuels by the use of technically acceptable silicone additives has not been completely resolved prior to this invention.

SUMMARY OF THE INVENTION

The present invention relates to succinic anhydride modified silicone polyethers and to their use as foam control agents in hydrocarbon liquids.

It is an object of the present invention to produce organopolysiloxanes which are useful as foam control agents in diesel fuels and jet fuels.

It is another object of this invention to produce organopolysiloxane foam control agents which display consistent compatibility and miscibility with fuel additive formulations.

It is another object of the present invention to employ organopolysiloxane foam control agents which are sparingly soluble or only dispersible in water.

It is a further object of the present invention to provide organopolysiloxane foam control agents which do not lose their defoaming capability during storage as readily as conventional silicone polyethers.

DETAILED DESCRIPTION OF THE INVENTION

The present invention relates to an organopolysiloxane compound having its formula selected from (i) $RR^1R^2SiO(R_2SiO)_a(RR^1SiO)_b(RR^2SiO)_cSiRR^1R^2$,
(ii) $RR^1R^2SiO(R_2SiO)_a(RR^2SiO)_cSiRR^1R^2$,
(iii) $RR^1R^2SiO(R_2SiO)_a(RR^1SiO)_bSiRR^1R^2$, or
(iv) $RR^1R^2SiO(R_2SiO)_aSiRR^1R^2$ wherein R is a monovalent hydrocarbon group having from 1 to 20 carbon atoms, $R^1$ is R or a group having its formula selected from (v) $-R^3-(C_2H_4O)_d-(C_3H_6O)_e-R^4$,
(vi) $-R^3O-(C_2H_4O)_d-R^4$, or
(vii) $-R^3-O-(C_3H_6O)_e-R^4$.

$R^2$ is R or a group having its formula selected from

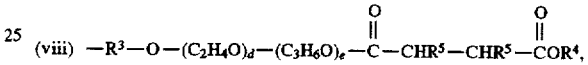

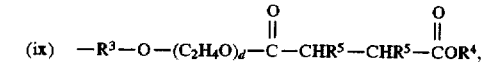

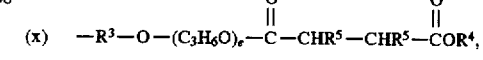

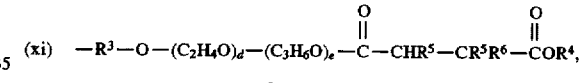

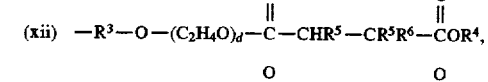

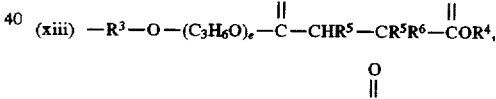

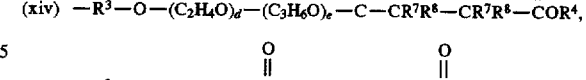

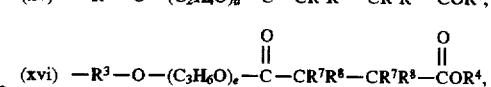

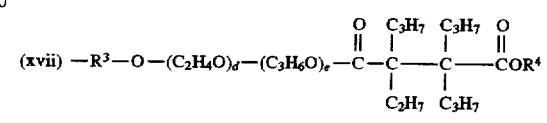

wherein $R^3$ is a divalent hydrocarbon group having from 1 to 20 carbon atoms, $R^4$ is selected from a hydrogen atom, an alkyl group, or an aryl group, $R^5$ and $R^6$ are each a group having the formula $-(C_nH_{2n+1})$ where n has a value from 1 to 30, $R^7$ and $R^8$ are each a group having the formula $-(C_nH_{2n+1})$ where n has a value of 1, 2, or 4 to 30, a has a value from 1 to 1000, b has a value from greater than zero to 100, c has a value from greater than zero to 100, d has a value from greater than zero to 150, and e has a value from greater than zero to 150, with the proviso that there is at least one group having its formula selected from formula (viii)–(xvii) as defined above per molecule.

In the formulas above. R is a monovalent hydrocarbon group having from 1 to 20 carbon atoms. Monovalent hydrocarbon radicals include alkyl groups, such as methyl, ethyl, propyl, butyl, hexyl, octyl, and decyl, cycloaliphatic groups, such as cyclohexyl; aryl groups, such as phenyl, tolyl, and xylyl, and aralkyl groups, such as benzyl and phenylethyl. It is preferred that the monovalent hydrocarbon radicals for R are methyl and phenyl. The several R radicals can be identical or different, as desired.

The group $R^3$ is a divalent hydrocarbon group having from 1 to 20 carbon atoms which is exemplified by groups such as alkylene groups including methylene, ethylene, propylene, butylene, pentylene, trimethylene, 2-methyltrimethylene, pentamethylene, hexamethylene, 3-ethyl-hexamethylene, octamethylene, —CH$_2$(CH$_3$)CH—, —CH$_2$CH(CH$_3$)CH$_2$—, —(CH$_2$)$_{18}$—, and cycloalkylene radicals such as cyclohexylene, arylene radicals such as phenylene, combinations of divalent hydrocarbon radicals such as benzylene (—C$_6$H$_4$CH$_2$—), and oxygen containing groups such as —CH$_2$OCH$_2$—, —CH$_2$CH$_2$CH$_2$OCH$_2$—, —CH$_2$CH$_2$OCH$_2$CH$_2$—, —COOCH$_2$CH$_2$OOC—, —CH$_2$CH$_2$OCH(CH$_3$)CH$_2$—, and —CH$_2$OCH$_2$CH$_2$OCH$_2$CH$_2$—. Preferred alkylene groups are those having from 2 to 8 carbon atoms.

The group $R^4$ can be a hydrogen atom, an alkyl group, or an aryl group. The alkyl groups are exemplified by methyl, ethyl, propyl, butyl, hexyl, octyl, and decyl. The aryl groups are exemplified by phenyl, tolyl, and xylyl.

The groups $R^5$ and $R^6$ are each a group having the formula —(C$_n$H$_{2n+1}$) where n has a value from 1 to 30. Groups suitable as $R^5$ and $R^6$ include —CH$_3$, —(C$_2$H$_5$), —(C$_3$H$_7$), —(C$_4$H$_9$), —(C$_6$H$_{13}$), —(C$_8$H$_{17}$), —(C$_9$H$_{19}$), —(C$_{10}$H$_{21}$), —(C$_{12}$H$_{25}$), —(C$_{14}$H$_{29}$), —(C$_{16}$H$_{33}$), —(C$_{18}$H$_{37}$), —(C$_{20}$H$_{41}$), or —(C$_{30}$H$_{61}$). The groups $R^5$ and $R^6$ may also be mixtures of the above substituted divalent hydrocarbon groups for example, mixtures of —(C$_4$H$_9$) and —(C$_8$H$_{17}$), —(C$_9$H$_{19}$) and —(C$_{10}$H$_{21}$), or —(C$_{12}$H$_{25}$) and —(C$_{18}$H$_{37}$). The groups described hereinabove for $R^5$ and $R^6$ may be the same or different as desired.

The groups $R^7$ and $R^8$ are each a group having the formula —(C$_n$H$_{2n+1}$) where n has a value of 1, 2, or 4 to 30. Groups suitable as $R^7$ and $R^8$ include —CH$_3$, —(C$_2$H$_5$), —(C$_4$H$_9$), —(C$_6$H$_{13}$), —(C$_8$H$_{17}$), —(C$_9$H$_{19}$), —(C$_{10}$H$_{21}$), —(C$_{12}$H$_{25}$), —(C$_{14}$H$_{29}$), —(C$_{16}$H$_{33}$), —(C$_{18}$H$_{37}$), —(C$_{20}$H$_{41}$), or —(C$_{30}$H$_{61}$). The groups $R^7$ and $R^8$ may also be mixtures of the above substituted divalent hydrocarbon groups for example, mixtures of —(C$_4$H$_9$) and —(C$_8$H$_{17}$), —(C$_9$H$_{19}$) and —(C$_{10}$H$_{21}$), or —(C$_{12}$H$_{25}$) and —(C$_{18}$H$_{37}$). The groups described hereinabove for $R^7$ and $R^8$ may be the same or different as desired.

It is also within the scope and spirit of the present invention that other alkylene oxide units such as butylene oxide can also be present in groups having the formula (v)–(xvii) as defined above. Furthermore, it is also within the scope of the present invention that groups having the formula (v)–(xvii) can be bonded to silicon through oxygen (i.e. bonded to silicon via an SiOC bond).

Preferred organopolysiloxane compounds of this invention have their formula selected from Me$_3$SiO(Me$_2$SiO)$_a$(MeR$^1$SiO)$_b$(MeR$^2$SiO)$_c$SiMe$_3$ or
Me$_3$SiO(Me$_2$SiO)$_a$(MeR$^2$SiO)$_c$SiMe$_3$ wherein $R^1$ is a group having its formula selected from —(CH$_2$)$_3$—O—(C$_2$H$_4$O)$_d$—(C$_3$H$_6$O)$_e$—H or —(CH$_2$)$_3$—O—(C$_2$H$_4$O)$_d$—H and $R^2$ is a group having its formula selected from

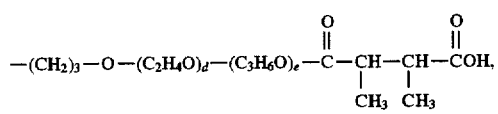

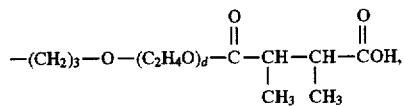

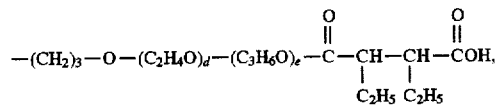

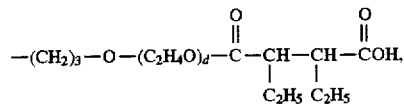

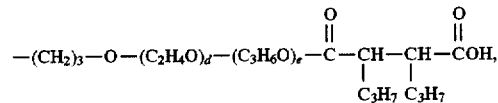

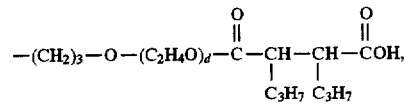

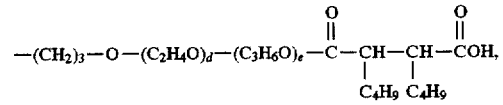

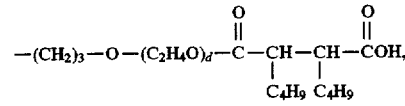

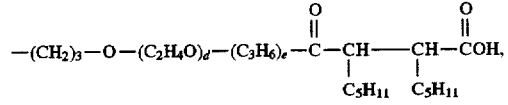

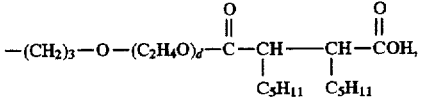

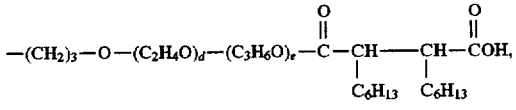

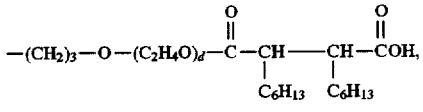

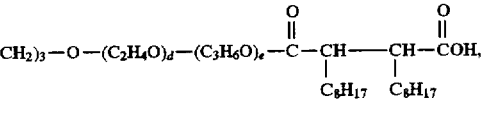

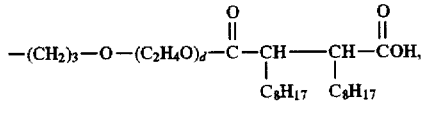

-continued $-(CH_2)_3-O-(C_2H_4O)_d-(C_3H_6O)_e-\overset{O}{\overset{\|}{C}}-\underset{C_9H_{19}}{\overset{}{CH}}-\underset{C_9H_{19}}{\overset{}{CH}}-\overset{O}{\overset{\|}{C}}OH,$ $-(CH_2)_3-O-(C_2H_4O)_d-\overset{O}{\overset{\|}{C}}-\underset{C_9H_{19}}{\overset{}{CH}}-\underset{C_9H_{19}}{\overset{}{CH}}-\overset{O}{\overset{\|}{C}}OH,$ $-(CH_2)_3-O-(C_2H_4O)_d-(C_3H_6O)_e-\overset{O}{\overset{\|}{C}}-\underset{C_{10}H_{21}}{\overset{}{CH}}-\underset{C_{10}H_{21}}{\overset{}{CH}}-\overset{O}{\overset{\|}{C}}OH,$ $-(CH_2)_3-O-(C_2H_4O)_d-\overset{O}{\overset{\|}{C}}-\underset{C_{10}H_{21}}{\overset{}{CH}}-\underset{C_{10}H_{21}}{\overset{}{CH}}-\overset{O}{\overset{\|}{C}}OH,$ $-(CH_2)_3-O-(C_2H_4O)_d-(C_3H_6O)_e-\overset{O}{\overset{\|}{C}}-\underset{CH_3}{\overset{}{CH}}-\underset{CH_3}{\overset{CH_3}{\overset{|}{C}}}-\overset{O}{\overset{\|}{C}}OH,$ $-(CH_2)_3-O-(C_2H_4O)_d-\overset{O}{\overset{\|}{C}}-\underset{CH_3}{\overset{}{CH}}-\underset{CH_3}{\overset{CH_3}{\overset{|}{C}}}-\overset{O}{\overset{\|}{C}}OH,$ $-(CH_2)_3-O-(C_2H_4O)_d-(C_3H_6O)_e-\overset{O}{\overset{\|}{C}}-\underset{C_2H_5}{\overset{}{CH}}-\underset{C_2H_5}{\overset{C_2H_5}{\overset{|}{C}}}-\overset{O}{\overset{\|}{C}}OH,$ $-(CH_2)_3-O-(C_2H_4O)_d-\overset{O}{\overset{\|}{C}}-\underset{C_2H_5}{\overset{}{CH}}-\underset{C_2H_5}{\overset{C_2H_5}{\overset{|}{C}}}-\overset{O}{\overset{\|}{C}}OH,$ $-(CH_2)_3-O-(C_2H_4O)_d-(C_3H_6O)_e-\overset{O}{\overset{\|}{C}}-\underset{C_3H_7}{\overset{}{CH}}-\underset{C_3H_7}{\overset{C_3H_7}{\overset{|}{C}}}-\overset{O}{\overset{\|}{C}}OH,$ $-(CH_2)_3-O-(C_2H_4O)_d-\overset{O}{\overset{\|}{C}}-\underset{C_3H_7}{\overset{}{CH}}-\underset{C_3H_7}{\overset{C_3H_7}{\overset{|}{C}}}-\overset{O}{\overset{\|}{C}}OH,$ $-(CH_2)_3-O-(C_2H_4O)_d-(C_3H_6O)_e-\overset{O}{\overset{\|}{C}}-\underset{C_4H_9}{\overset{}{CH}}-\underset{C_4H_9}{\overset{C_4H_9}{\overset{|}{C}}}-\overset{O}{\overset{\|}{C}}OH,$ $-(CH_2)_3-O-(C_2H_4O)_d-\overset{O}{\overset{\|}{C}}-\underset{C_4H_9}{\overset{}{CH}}-\underset{C_4H_9}{\overset{C_4H_9}{\overset{|}{C}}}-\overset{O}{\overset{\|}{C}}OH,$ $-(CH_2)_3-O-(C_2H_4O)_d-(C_3H_6O)_e-\overset{O}{\overset{\|}{C}}-\underset{C_6H_{13}}{\overset{}{CH}}-\underset{C_6H_{13}}{\overset{C_6H_{13}}{\overset{|}{C}}}-\overset{O}{\overset{\|}{C}}OH,$ $-(CH_2)_3-O-(C_2H_4O)_d-\overset{O}{\overset{\|}{C}}-\underset{C_6H_{13}}{\overset{}{CH}}-\underset{C_6H_{13}}{\overset{C_6H_{13}}{\overset{|}{C}}}-\overset{O}{\overset{\|}{C}}OH,$ -continued $-(CH_2)_3-O-(C_2H_4O)_d-(C_3H_6O)_e-\overset{O}{\overset{\|}{C}}-\underset{C_8H_{17}}{\overset{}{CH}}-\underset{C_8H_{17}}{\overset{C_8H_{17}}{\overset{|}{C}}}-\overset{O}{\overset{\|}{C}}OH,$ $-(CH_2)_3-O-(C_2H_4O)_d-\overset{O}{\overset{\|}{C}}-\underset{C_8H_{17}}{\overset{}{CH}}-\underset{C_8H_{17}}{\overset{C_8H_{17}}{\overset{|}{C}}}-\overset{O}{\overset{\|}{C}}OH,$ $-(CH_2)_3-O-(C_2H_4O)_d-(C_3H_6O)_e-\overset{O}{\overset{\|}{C}}-\underset{C_{10}H_{21}}{\overset{}{CH}}-\underset{C_{10}H_{21}}{\overset{C_{10}H_{21}}{\overset{|}{C}}}-\overset{O}{\overset{\|}{C}}OH,$ $-(CH_2)_3-O-(C_2H_4O)_d-\overset{O}{\overset{\|}{C}}-\underset{C_{10}H_{21}}{\overset{}{CH}}-\underset{C_{10}H_{21}}{\overset{C_{10}H_{21}}{\overset{|}{C}}}-\overset{O}{\overset{\|}{C}}OH,$ $-(CH_2)_3-O-(C_2H_4O)_d-(C_3H_6O)_e-\overset{O}{\overset{\|}{C}}-\underset{CH_3}{\overset{CH_3}{\overset{|}{C}}}-\underset{CH_3}{\overset{CH_3}{\overset{|}{C}}}-\overset{O}{\overset{\|}{C}}OH,$ $-(CH_2)_3-O-(C_2H_4O)_d-\overset{O}{\overset{\|}{C}}-\underset{CH_3}{\overset{CH_3}{\overset{|}{C}}}-\underset{CH_3}{\overset{CH_3}{\overset{|}{C}}}-\overset{O}{\overset{\|}{C}}OH,$ $-(CH_2)_3-O-(C_2H_4O)_d-(C_3H_6O)_e-\overset{O}{\overset{\|}{C}}-\underset{C_2H_5}{\overset{C_2H_5}{\overset{|}{C}}}-\underset{C_2H_5}{\overset{C_2H_5}{\overset{|}{C}}}-\overset{O}{\overset{\|}{C}}OH,$ $-(CH_2)_3-O-(C_2H_4O)_d-\overset{O}{\overset{\|}{C}}-\underset{C_2H_5}{\overset{C_2H_5}{\overset{|}{C}}}-\underset{C_2H_5}{\overset{C_2H_5}{\overset{|}{C}}}-\overset{O}{\overset{\|}{C}}OH,$ $-(CH_2)_3-O-(C_2H_4O)_d-(C_3H_6O)_e-\overset{O}{\overset{\|}{C}}-\underset{C_3H_7}{\overset{C_3H_7}{\overset{|}{C}}}-\underset{C_3H_7}{\overset{C_3H_7}{\overset{|}{C}}}-\overset{O}{\overset{\|}{C}}OH,$ $-(CH_2)_3-O-(C_2H_4O)_d-(C_3H_6O)_e-\overset{O}{\overset{\|}{C}}-\underset{C_3H_7}{\overset{C_3H_7}{\overset{|}{C}}}-\underset{C_3H_7}{\overset{C_3H_7}{\overset{|}{C}}}-\overset{O}{\overset{\|}{C}}OC_2H_5,$ $-(CH_2)_3-O-(C_2H_4O)_d-(C_3H_6O)_e-\overset{O}{\overset{\|}{C}}-\underset{C_4H_9}{\overset{C_4H_9}{\overset{|}{C}}}-\underset{C_4H_9}{\overset{C_4H_9}{\overset{|}{C}}}-\overset{O}{\overset{\|}{C}}OH,$ $-(CH_2)_3-O-(C_2H_4O)_d-\overset{O}{\overset{\|}{C}}-\underset{C_4H_9}{\overset{C_4H_9}{\overset{|}{C}}}-\underset{C_4H_9}{\overset{C_4H_9}{\overset{|}{C}}}-\overset{O}{\overset{\|}{C}}OH,$ $-(CH_2)_3-O-(C_2H_4O)_d-(C_3H_6O)_e-\overset{O}{\overset{\|}{C}}-\underset{C_5H_{11}}{\overset{C_5H_{11}}{\overset{|}{C}}}-\underset{C_5H_{11}}{\overset{C_5H_{11}}{\overset{|}{C}}}-\overset{O}{\overset{\|}{C}}OH,$ $-(CH_2)_3-O-(C_2H_4O)_d-\overset{O}{\overset{\|}{C}}-\underset{C_5H_{11}}{\overset{C_5H_{11}}{\overset{|}{C}}}-\underset{C_5H_{11}}{\overset{C_5H_{11}}{\overset{|}{C}}}-\overset{O}{\overset{\|}{C}}OH,$ -continued

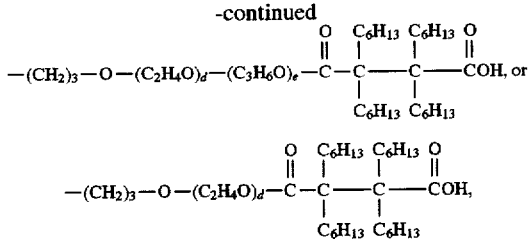

wherein Me denotes methyl, a has a value from 1 to 200, b has a value from greater than zero to 40, c has a value from greater than zero to 40. $R^3$ is an alkylene group having from 2 to 8 carbon atoms, d has a value from greater than zero to 50, and e has a value from greater than zero to 50. It is preferred for the compounds of this invention that when b is greater than zero, that b and c be present in a ratio from 40/60 to 60/40.

The present invention further relates to a composition comprising (A) a hydrocarbon fuel, and (B) an organopolysiloxane compound having its formula selected from
(i) $RR^1R^2SiO(R_2SiO)_a(RR^1SiO)_b(RR^2SiO)_cSiRR^1R^2$,
(ii) $RR^1R^2SiO(R_2SiO)_a(RR^2SiO)_cSiRR^1R^2$,
(iii) $RR^1R^2SiO(R_2SiO)_a(RR^1SiO)_bSiRR^1R^2$, or
(iv) $RR^1R^2SiO(R_2SiO)_aSiRR^1R^2$
wherein R is a monovalent hydrocarbon group having from 1 to 20 carbon atoms, $R^1$ is R or a group having its formula selected from
(v) $-R^3-O-(C_2H_4O)_d-(C_3H_6O)_e-R^4$,
(vi) $-R^3-O-(C_2H_4O)_d-R^4$, or
(vii) $-R^3-O-(C_3H_6O)_e-R^4$.
$R^2$ is R or a group having its formula selected from

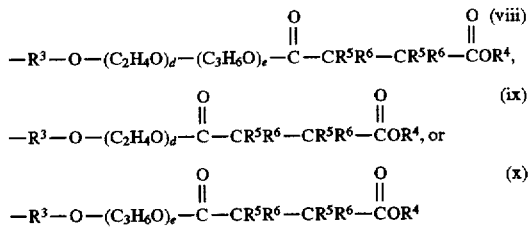

wherein $R^3$ is a divalent hydrocarbon group having from 1 to 20 carbon atoms, $R^4$ is selected from a hydrogen atom, an alkyl group, or an aryl group, $R^5$ and $R^6$ are selected from a hydrogen atom or a group having the formula $-(C_nH_{2n+1})$ where n has a value from 1 to 30, a has a value from 1 to 1000, b has a value from greater than zero to 100, c has a value from greater than zero to 100, d has a value from greater than zero to 150, and e has a value from greater than zero to 150, with the proviso that there is at least one group having its formula selected from formula (viii), (ix), or (x) as defined above per molecule.

The hydrocarbon fuels of component (A) include fuels such as diesel fuel and jet fuel. The hydrocarbon fuel is preferably a diesel fuel used as a fuel for motor vehicles, e.g. cars and heavy goods vehicles, and marine use, or a jet fuel. By the expression "diesel fuel" where used herein is meant gas oil and fuel oil including those materials which are referred to as light domestic and heating oils and diesel fuel and irrespective of whether they are intended for vehicular, marine, heating or other use. These materials are loosely characterized as having a viscosity of not more than 115" Redwood 1 at 38° C. and a boiling point in the range of about 200° C. to about 380° C. Particularly embraced within the expression are those hydrocarbon liquids having a viscosity of about 30 to 40" Redwood at 38° C., including those having a viscosity at 20° C. in the range of about 2.9 to about 10.2 $mm^2/s$, and at 38° C. in the range of about 1.6 to about 6.0 $mm^2/s$. Further, these materials have a carbon residue (Conradson) of <0.2% by weight, a water content of <0.05% by weight, a sulphur content of <1.0% by weight and a net calorific value from about 10100 to about 10300 Kcal/Kg.

By the expression "jet fuel" where used herein is meant kerosene, light oils and medium oils for example that known as AVTUR fuel. AVTUR fuel is a medium oil distilling between 150° and 300° C. that distills at least 65% in volume at 250°, has a flash point above 38° C., has a maximum aromatic content of 20% by volume, has been treated to have a kinematic viscosity of less than 15 $mm^2/s$ at −34° C., and has a freezing point not greater than −50° C.

The hydrocarbon fuels of component (A) may also be, for example, residual fuel oils having a viscosity at 38° C. of greater than 115" Redwood 1, light medium and heavy naphtha, vaporizing oils, motor oils, and motor spirits.

In the formulas above, R is a monovalent hydrocarbon group having from 1 to 20 carbon atoms. The monovalent hydrocarbon radicals suitable as R are as delineated above for the compounds of this invention. It is preferred that the monovalent hydrocarbon radicals for R are methyl and phenyl. The several R radicals can be identical or different, as desired.

The group $R^3$ is a divalent hydrocarbon group having from 1 to 20 carbon atoms and are as delineated above for the compounds of this invention. Preferred alkylene groups are those having from 2 to 8 carbon atoms such as methylene, ethylene, propylene, butylene, pentylene, trimethylene, 2-methyltrimethylene, pentamethylene, hexamethylene 3-ethylhexamethylene, or octamethylene.

The group $R^4$ is a hydrogen atom, an alkyl group, or an aryl group as described above for the compounds of this invention. It is preferred that $R^4$ is selected from hydrogen, methyl, or ethyl.

The groups $R^5$ and $R^6$ are selected from a hydrogen atom or a group having the formula $-(C_nH_{2n+1})$ where n has a value from 1 to 30. Groups suitable as $R^5$ and $R^6$ include hydrogen, $-CH_3$, $-(C_2H_5)$, $-(C_3H_7)$, $-(C_4H_9)$, $-(C_6H_{13})$, $-(C_8H_{17})$, $-(C_9H_{19})$, $-(C_{10}H_{21})$, $-(C_{12}H_{25})$, $-(C_{14}H_{29})$, $-(C_{16}H_{33})$, $-(C_{18}H_{37})$, $-(C_{20}H_{41})$, or $-(C_{30}H_{61})$. The groups $R^5$ and $R^6$ may also be mixtures of substituted divalent hydrocarbon groups for example, mixtures of $-(C_4H_9)$ and $-(C_8H_{17})$, $-(C_9H_{19})$ and $-(C_{10}H_{21})$, or $-(C_{12}H_{25})$ and $-(C_{18}H_{37})$. The groups described hereinabove for $R^5$ and $R^6$ may be the same or different as desired.

It is also within the scope and spirit of the present invention that other alkylene oxide units such as butylene oxide can also be present in groups having the formula (v)–(x) as defined above. Furthermore, it is also within the scope of the present invention that groups having the formula (v)–(x) can be bonded to silicon through oxygen (i.e. bonded to silicon via an SiOC bond).

Preferred organopolysiloxane compounds as component (B) have their formula selected from
$Me_3SiO(Me_2SiO)_a(MeR^1SiO)_b(MeR^2SiO)_cSiMe_3$ or
$Me_3SiO(Me_2SiO)_a(MeR^2SiO)_cSiMe_3$
wherein $R^1$ is a group having its formula selected from
$-(CH_2)_3-O-(C_2H_4O)_d-(C_3H_6O)_e-H$ or $-(CH_2)_3-$
$O-(C_2H_4O)_d-H$ and $R^2$ is a group having its formula selected from

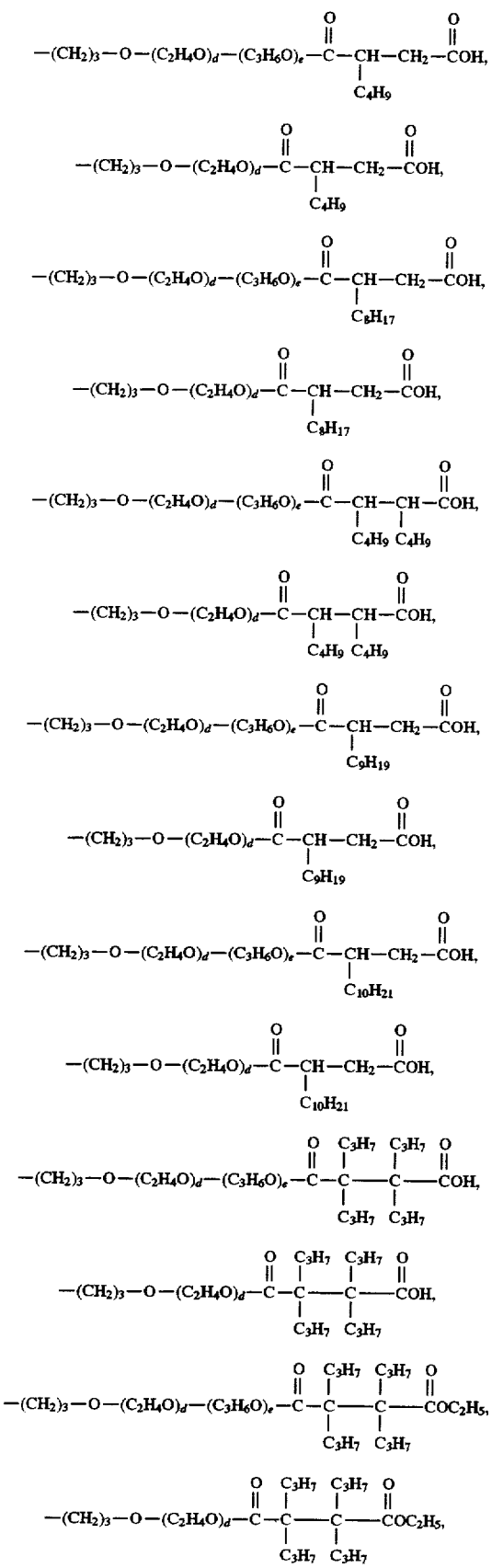
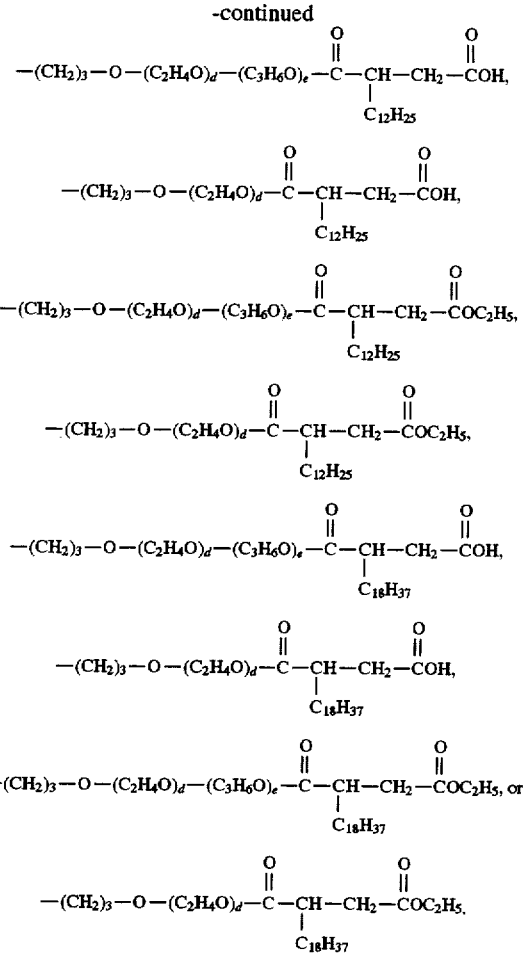

wherein Me denotes methyl, a has a value from 1 to 200, b has a value from greater than zero to 40, c has a value from greater than zero to 40, $R^3$ is an alkylene group having from 2 to 8 carbon atoms, d has a value from greater than zero to 50, and e has a value from greater than zero to 50.

The organopolysiloxane copolymers of the present invention may be added to the hydrocarbon fuel in any desired quantity and incorporated into the hydrocarbon liquid in any suitable manner. The copolymers are added to the hydrocarbon liquid in the form of a solution or dispersion. The preferred copolymers are effective to reduce the tendency of hydrocarbon liquids to foam when used in quantities of 100 parts per million or less, for example in the range from about 1 to about 50 ppm by volume, the most preferred copolymers being effective when used in quantities from 1 to 20 ppm by volume of the fuel.

Frequently hydrocarbon liquids also comprise various "additive packages". The additive packages contain corrosion inhibitors, anti-scaling agents, octane improvers, emulsifiers, detergents, demulsifiers, and/or drying agents to counteract water absorbed by the fuel during normal transfer operations and use conditions, etc., to improve overall engine performance and thus it is within the scope of the present invention that these types of additives may also be present in the compositions of this invention. The types and quantities of these additives are well known to those skilled in the art.

The organopolysiloxanes of this invention are particularly beneficial in the control of foaming of hydrocarbon liquids and especially diesel fuels as they are pumped rapidly from one vessel to another in the presence of air, and possibly in the presence of water. Such circumstances may occur for example during transfer of materials though a supply pipe from one vessel to another, as required during separation of various grades of hydrocarbon liquids from crude oil or separation of various grades of hydrocarbon liquid from selected feedstocks, and in transfer of hydrocarbon liquids from road tankers to static storage tanks.

The organopolysiloxane foam control agents may be added directly to the hydrocarbon fuel, or may be predispersed in a predispersant such as the hydrocarbon liquid, xylene, toluene, naphtha, and other aromatic compounds, various ketones, esters, ethers, and other commonly used organic solvents.

The following examples are disclosed to further teach, but not limit, the invention which is properly delineated by the appended claims. All amounts (parts and percentages) are by weight unless otherwise indicated.

EXAMPLE 1

Compound A was an organopolysiloxane having the formula $Me_3SiO(Me_2SiO)_{13.5}(MeR^1SiO)_{1.9}SiMe_3$ wherein $R^1$ is a group having the formula $—(CH_2)_3—O—(C_2H_4O)_{12}H$ wherein Me hereinafter denotes methyl. Compound A is an antifoam compound which falls within the scope of the disclosure of U.S. Pat. No. 4,690,688.

Compound B was prepared by placing 82.8 weight percent of Compound A described above and 17.2 weight percent of n-octenylsuccinic anhydride into a 3-necked flask equipped with a stirrer, thermometer, and temperature controller. The mixture was heated to 100° C. for 2 hours. Next, the mixture was allowed to cool to room temperature.

Compound C was prepared in the same manner as compound B above, except that 81.8 weight percent of Compound A and 18.2 weight percent of nonenylsuccinic anhydride were used in the reaction.

Compound D was prepared in the same manner as compound B above, except that 80.9 weight percent of Compound A and 19.1 weight percent of n-decenylsuccinic anhydride were used in the reaction.

Compound E was prepared in the same manner as compound B above, except that 79.2 weight percent of Compound A and 20.8 weight percent of tetra(isopropyl)succinic anhydride were used in the reaction.

The resulting organopolysiloxane compounds had the average formula $Me_3SiO(Me_2SiO)_{13.5}(MeR^1SiO)_{1.9}SiMe_3$ wherein $R^1$ is a group having the formula $—(CH_2)_3—O—(C_2H_4O)_{12}R^2$ wherein R2 is defined in the following Table:

TABLE 1

| Compound | R² |
|---|---|
| B | $—C(=O)—CH(C_8H_{17})—CH_2—C(=O)OH$ |
| C | $—C(=O)—CH(C_9H_{19})—CH_2—C(=O)OH$ |
| D | $—C(=O)—CH(C_{10}H_{21})—CH_2—C(=O)OH$ |

TABLE 1-continued

| Compound | R² |
|---|---|
| E | $—C(=O)—C(C_3H_7)(C_3H_7)—C(C_3H_7)(C_3H_7)—C(=O)OH$ |

Compounds A, B, C, D, and E, were then individually cold blended with a commercially available diesel fuel additive denoted "Additive X1". The concentration of the organopolysiloxane compound was about 1.6 weight percent in the additive.

Each of the mixtures prepared above were then mixed with a commercially available diesel fuel having a low sulfur content such that the concentration of each of the organopolysiloxane compounds was about 8 parts per million (ppm) based on the total weight of the fuel. The fuel containing Compound A was denoted "Fuel A", the fuel containing compound B was denoted "Fuel B", etc. Fuel A, B, C, D, E, and a "fuel control" (which contained diesel fuel and Additive X1 but no organopolysiloxane compound) were each subjected to a Shake Test. In the Shake Test, 100 cc's of the each of the mixtures were pipetted into separate 250 cc graduated cylinders. The cylinders were then stopped with a glass stopper and the contents shaken 100 times during a one minute period. The foam volume immediately after shaking had stopped was recorded and the amount of time required for the foam to break and expose a clear section of liquid was measured. The fuels were tested 1 day after they were prepared (i.e. after addition of the organopolysiloxane compound-additive mixture to each of the fuels). The foam height of each fuel was then converted to a "Percent Foam Volume" using the following formula, which is relative to the original liquid volume of 100 cc: 100×{(recorded total liquid and foam volume−100 cc)/100 cc}="Percent Foam Volume". The results of the test are disclosed in Table 2 below.

TABLE 2

| Fuel | % Foam Volume | Break Time |
|---|---|---|
| FUEL CONTROL | +53% | 13 sec. |
| A | +30% | 4 sec. |
| B | +45% | 5 sec. |
| C | +50% | 5 sec. |
| D | +51% | 6 sec. |
| E | +49% | 10 sec. |

Table 2 shows that fuel containing a compound of this invention such as Compound B, C, or D had equivalent break times to a fuel containing a prior art compound (Compound A) and was superior in both break time and percent foam volume in comparison to the untreated diesel fuel and thus the compounds of this invention were effective foam control agents.

EXAMPLE 2

Compound F was prepared by placing 82.8 weight percent of Compound A of Example 1 and 17.2 weight percent of di-isobutenylsuccinic anhydride into a 3-necked flask equipped with a stirrer, thermometer, and temperature controller. The mixture was heated to 100° C. for 2 hours. Next, the mixture was allowed to cool to room temperature.

Compound G was prepared in the same manner as compound F above, except that 74.2 weight percent of Compound A and 25.8 weight percent of iso-octenylsuccinic anhydride were used in the reaction.

Compound H was prepared in the same manner as compound F above, except that 49.8 weight percent of Compound A and 50.2 weight percent of polyisobutenylsuccinic anhydride were used in the reaction.

The resulting organopolysiloxane compounds had the average formula $Me_3SiO(Me_2SiO)_{13.5}(MeR^1SiO)_{1.9}SiMe_3$ wherein $R^1$ is a group having the formula —$(CH_2)_3$—O—$(C_2H_4O)_{12}R^2$ wherein $R^2$ is defined in the following Table:

TABLE 3

| Compound | $R^2$ |
|---|---|
| F | —C(=O)—CH(iso-$C_4H_9$)—CH(iso-$C_4H_9$)—COH(=O) |
| G | —C(=O)—CH(iso-$C_8H_{17}$)—CH$_2$—COH(=O) |
| H | —C(=O)—CH(poly-iso-$C_4H_9$)—CH$_2$—COH(=O) |

Compounds A, B, C, D, and E from Example 1 and Compounds F, G, and H where then individually cold blended with a commercially available diesel fuel additive denoted "Additive X2". The concentration of each organopolysiloxane compound was about 1.6 weight percent in the additive. The compatibility of each of the compounds in the additive was then tested. The additive and compound were determined to be compatible if the mixture of the organopolysiloxane compound and the fuel additive yielded a clear solution. If the resulting solution was cloudy then there was no compatibility. The results of the compatibility test are described in Table 4 hereinbelow.

TABLE 4

| Mixture | Compatibility |
|---|---|
| A | NO |
| B | YES |
| C | YES |
| D | YES |
| E | YES |
| F | YES |
| G | YES |
| H | YES |

It is apparent from Table 4 that a diesel fuel additive and a compound of the present invention which contains a polyether group which is capped by a succinic anhydride group such as Compound B, C, D, E, F, G, or H are more compatible in comparison to the prior art compound (Compound A) which was not compatible with the fuel additive.

Each of the mixtures prepared above were then mixed with a commercially available diesel fuel having a low sulfur content such that the concentration of each of the organopolysiloxane compounds was about 8 parts per million (ppm) based on the total weight of the fuel. The fuels containing Compound. A, B, C, D, E, F, G, and H respectively, and a fuel control as described above were each subjected to the Shake Test procedure described in Example 1 except that in this instance 50 cc's of each fuel were pipetted into separate 100 cc graduated cylinders. The foam height of each fuel was then converted to a "Percent Foam Volume" using the following formula, which is relative to the original liquid volume of 50cc: 100×{(recorded total liquid and foam volume–50 cc)/50 cc}="Percent Foam Volume". The fuels were tested 1 day after they were prepared. The results are shown in Table 5 below.

TABLE 5

| Fuel | % Foam Volume | Break Time |
|---|---|---|
| FUEL CONTROL | +53% | 13 sec. |
| A | +20% | 3 sec. |
| B | +43% | 7 sec. |
| C | +40% | 7 sec. |
| D | +43% | 8 sec. |
| E | +42% | 7 sec. |
| F | +41% | 21 sec. |
| G | +43% | 8 sec. |
| H | +43% | 26 sec. |

It can be seen from Table 5 that generally a fuel containing a compound of the present invention, on average, (Fuels B–E, G), had nearly equivalent break times to a fuel containing a prior art compound (Compound A), and in general has superior break times in comparison to the untreated diesel fuel and thus the compounds of this invention were effective foam control agents.

EXAMPLE 3

Compounds A, F, C, and E were mixed in a concentration of 1.6 weight percent with a diesel fuel additive denoted "Additive X3". Each of the respective mixtures were then individually added to a commercially available diesel fuel having a low sulfur content such that the concentration of each of the organopolysiloxane compounds was about 8 parts per million (ppm) based on the total weight of the fuel. The fuel containing Compound A was denoted "Fuel A", the fuel containing compound F was denoted "Fuel F", etc. Fuel A, F, C, and E, and a "fuel control" (which contained diesel fuel and Additive X3 but no organopolysiloxane compound) were each subjected to the Shake Test procedure described in Example 2 and the Percent Foam Volume of each fuel was then calculated according to the procedure described in Example 1. The results of the test are disclosed in Table 6 below.

TABLE 6

| Fuel | % Foam Volume | Break Time |
|---|---|---|
| FUEL CONTROL | +40% | 13 sec. |
| A | +33% | 4 sec. |
| F | +40% | 11 sec. |
| C | +40% | 8 sec. |
| E | +43% | 27 sec. |

Table 6 shows that fuel containing a compound of this invention such as Compound C or F had nearly equivalent break times to a fuel containing a prior art compound (Compound A) and was superior in break time in comparison to the untreated diesel fuel and thus the compounds of this invention were effective foam control agents in this fuel system.

EXAMPLE 4

Compound I was prepared by placing 249.6 grams of Compound A described hereinabove and 12.6 grams of n-nonenylsuccinic anhydride into a 3-necked flask equipped with a stirrer, thermometer, and temperature controller. The mixture was heated to 100° C. for 2 hours. Next, the mixture was allowed to cool to room temperature.

Compound J was prepared in the same manner as compound I above, except that 249.6 grams of Compound A and 25.2 grams of n-nonenylsuccinic anhydride were used in the reaction.

Compound K was prepared in the same manner as compound I above, except that 249.6 grams of Compound A and 37.8 grams of n-nonenylsuccinic anhydride were used in the reaction.

The resulting organopolysiloxane compounds had the average formula $Me_3SiO(Me_2SiO)_{13.5}(MeR^1SiO)_{1.9}SiMe_3$ wherein $R^1$ is a group having the formula —$(CH_2)_3$—O—$(C_2H_4O)_{12}R^2$ wherein $R^2$ is defined in the following Table:

TABLE 7

| Compound | $R^2$ |
|---|---|
| I | 75% molar —H |
| | 25% molar —C(=O)—CH($C_9H_{19}$)—$CH_2$—C(=O)OH |
| J | 50% molar —H |
| | 50% molar —C(=O)—CH($C_9H_{19}$)—$CH_2$—C(=O)OH |
| K | 25% molar —H |
| | 75% molar —C(=O)—CH($C_9H_{19}$)—$CH_2$—C(=O)OH |

Compounds I, J, K, A, and C, were then individually cold blended with propylene carbonate as a diluent. The concentration of the organopolysiloxane compound was about 1.6 weight percent in the diluent.

Each of the mixtures prepared above were then mixed with a commercially available off-highway diesel fuel having a high sulfur content such that the concentration of each of the organopolysiloxane compounds was about 8 parts per million (ppm) based on the total weight of the fuel. The fuel containing Compound I was denoted "Fuel I", the fuel containing compound J was denoted "Fuel J", etc. Fuel I, J, K, A, and C, and a "fuel control" (which contained diesel fuel and the diluent but no organopolysiloxane compound) were each subjected to the Shake Test procedure described in Example 1 and the Percent Foam Volume of each fuel was then calculated according to the procedure described in Example 1. The fuels were tested 3 days after they were prepared. The results of the test are disclosed in Table 8 below.

TABLE 8

| Fuel | % Foam Volume | Break Time |
|---|---|---|
| FUEL CONTROL | +34% | 23 sec. |
| A | +11% | 15 sec. |
| I | +19% | 24 sec. |
| J | +12% | 15 sec. |
| K | +19% | 18 sec. |
| C | +24% | 28 sec. |

Table 8 illustrates that fuels that contain organopolysiloxane compounds which have 50 to 75 percent molar of the end of the polyether group capped with a succinic anhydride group are preferred and that all of the fuels of the instant invention were effective foam control agents.

EXAMPLE 5

The procedure of Example 4 was repeated using fuels I, J, K, A, and C except that in this case the fuels were subjected to the shake test procedure of Example 2. The Percent Foam Volume of each fuel was again calculated according to the procedure described in Example 1. The fuels were tested the same day they were prepared. The results of the test are disclosed in Table 9 below.

TABLE 9

| Fuel | % Foam Volume | Break Time |
|---|---|---|
| FUEL CONTROL | +33% | 35 sec. |
| A | +14% | 15 sec. |
| I | +13% | 17 sec. |
| J | +10% | 10 sec. |
| K | +16% | 17 sec. |
| C | +23% | 27 sec. |

Table 9 illustrates that fuels that contain organopolysiloxane compounds which have 50 to 75 percent molar of the end of the polyether group capped with a succinic anhydride group are preferred and that all of the fuels of the instant invention were effective foam control agents.

EXAMPLE 6

The procedure of Example 4 was repeated using fuels I, J, K, A, and C except that in this case the diluent was xylene. The results of the test are disclosed in Table 10 below.

TABLE 10

| Fuel | % Foam Volume | Break Time |
|---|---|---|
| FUEL CONTROL | +26% | 23 sec. |
| A | +12% | 12 sec. |
| I | +13% | 23 sec. |
| J | +10% | 11 sec. |
| K | +14% | 16 sec. |
| C | +23% | 22 sec. |

Table 10 illustrates that fuels that contain organopolysiloxane compounds which have 50 to 75 percent molar of the end of the polyether group capped with a succinic anhydride group are preferred and that all of the fuels of the instant invention were effective foam control agents.

EXAMPLE 7

Compounds I, J, K, A, and C above were mixed with diesel fuel additive "X2" above in a concentration of 1.6 weight percent of organopolysiloxane compound in the additive. The compatibility of the mixtures was then tested according to the procedure described in Example 2. The results are shown in Table 11 below.

TABLE 11

| Mixture | Compatibility |
|---|---|
| A | NO |
| I | YES |

TABLE 11-continued

| Mixture | Compatibility |
|---------|---------------|
| J | YES |
| K | YES |
| C | YES |

Table 11 shows that the compounds of the instant invention were compatible with a diesel fuel additive even when only 25 percent molar of the polyether is capped with a succinic anhydride group.

EXAMPLE 8

Compound L was an organopolysiloxane having the formula $Me_3SiO(Me_2SiO)_{157}(MeR^1SiO)_{21}SiMe_3$ wherein $R^1$ is a group having the formula $-(CH_2)_3-O-(C_2H_4O)_{10}-(C_3H_6O)_4-H$. Compound L is an antifoam compound which falls within the scope of the disclosure of U.S. Pat. No. 3,233,986.

Compound M was prepared according to the procedure in Example 1, except that 99.2 grams of Compound L above was used in place of Compound A and 0.8 grams of nonenyl succinic anhydride were used in the reaction.

Compound N was prepared according to the procedure in Example 1, except that 99.5 grams of Compound L above was used in place of Compound A and 0.5 grams of nonenyl succinic anhydride were used in the reaction.

The resulting organopolysiloxane compounds had the average formula $Me_3SiO(Me_2SiO)_{157}(MeR^1SiO)_{21}SiMe_3$ wherein $R^1$ is a group having the formula $-(CH_2)_3-O-(C_2H_4O)_{10}-(C_3H_6O)_4-R^2$ wherein $R^2$ is defined in the following Table:

TABLE 12

| Compound | $R^2$ |
|----------|-------|
| M | 100% molar $-\overset{O}{\overset{\|}{C}}-CH(C_9H_{19})-CH_2-\overset{O}{\overset{\|}{C}}OH$ |
| N | 50% molar $-H$ |
|   | 50% molar $-\overset{O}{\overset{\|}{C}}-CH(C_9H_{19})-CH_2-\overset{O}{\overset{\|}{C}}OH$ |

Compounds L, M, and N were mixed in a concentration of 1.6 weight percent with diesel fuel additive X3 described above. Each of the respective mixtures were then individually added to a commercially available diesel fuel having a low sulfur content such that the concentration of each of the organopolysiloxane compounds was about 8 parts per million (ppm) based on the total weight of the fuel. Fuel L, M, N, and a "fuel control" (which contained diesel fuel and Additive X3 but no organopolysiloxane compound) were each subjected to the Shake Test procedure described in Example 1 and the Percent Foam Volume of each fuel was then calculated according to the procedure described in Example 1. The fuels were tested the day they were prepared and then 3 days after they were prepared. The results of the test are disclosed in Tables 13 and 14 below.

TABLE 13

| | DAY 0 | |
|---|---|---|
| Fuel | % Foam Volume | Break Time |
| FUEL CONTROL | +34% | 21 sec. |
| L | +0% | 0 sec. |
| M | +0% | 0 sec. |
| N | +0% | 0 sec. |

TABLE 14

| | DAY 3 | |
|---|---|---|
| Fuel | % Foam Volume | Break Time |
| FUEL CONTROL | +28% | 22 sec. |
| L | +0% | 0 sec. |
| M | +0% | 0 sec. |
| N | +0% | 0 sec. |

Tables 13 and 14 show that the compounds of this invention were effective foam control agents in diesel fuels.

EXAMPLE 9

Compound O was prepared according to the procedure described in Example 1, except 49.6 grams of Compound L described above and 0.5 grams of dodecenyl succinic anhydride were used in the reaction.

Compound P was prepared by mixing 74.3 grams of Compound L above and 0.7 grams of dodecenyl succinic anhydride in a flask. This solution was then heated to a temperature of 100° C. for 1 hour. Next, 77.2 grams of ethanol was added to the flask, and then the solution was catalyzed with 0.39 microliters of 1 molar HCl and this solution was then heated to 70° C. for 1 hour. The solution was then allowed to cool to room temperature. Next, 1.6 grams of sodium bicarbonate was added to the solution and the solution was then allowed to equilibrate for one hour. The salts were then filtered from the solution and the remaining ethanol was removed by vacuum stripping the solution.

Compound Q was prepared in the same manner as compound O above, except that 49.4 grams of Compound L and 0.7 grams of iso-octadecenyl succinic anhydride in place of the dodecenyl succinic anhydride were used in the reaction.

Compound R was prepared according to the procedure described for Compound P, except that 49.4 grams of Compound L, 0.7 grams of iso-octadecenyl succinic anhydride in place of the dodecenyl succinic anhydride, and 51.3 grams of ethanol were used in the reaction.

The resulting organopolysiloxane compounds had the average formula $Me_3SiO(Me_2SiO)_{157}(MeR^1SiO)_{21}SiMe_3$ wherein $R^1$ is a group having the formula $-(CH_2)_3-O-(C_2H_4O)_{10}-(C_3H_6O)_4-R^2$ wherein $R^2$ is defined in the following Table:

TABLE 15

| Compound | R² |
|---|---|
| O | $-\text{C}-\text{C}-\text{C}-\text{COH}$ with $\text{C}_3\text{H}_7$, $\text{C}_3\text{H}_7$, $\text{C}_3\text{H}_7$, $\text{C}_3\text{H}_7$ substituents, and two C=O groups |
| P | $-\text{C}-\text{C}-\text{C}-\text{COC}_2\text{H}_5$ with $\text{C}_3\text{H}_7$, $\text{C}_3\text{H}_7$, $\text{C}_3\text{H}_7$, $\text{C}_3\text{H}_7$ substituents, and two C=O groups |
| Q | $-\text{C}-\text{CH}(\text{C}_{18}\text{H}_{37})-\text{CH}_2-\text{COH}$ with two C=O groups |
| R | $-\text{C}-\text{CH}(\text{C}_{18}\text{H}_{37})-\text{CH}_2-\text{COC}_2\text{H}_5$ with two C=O groups |

Compounds A, O, P, Q, and R were then individually cold blended with a commercially available diesel fuel additive denoted "Additive X1". The concentration of the organopolysiloxane compound was about 1.6 weight percent in the additive.

Each of the mixtures prepared above were then mixed with a commercially available off-highway diesel fuel having a high sulfur content such that the concentration of each of the organopolysiloxane compound was about 8 parts per million (ppm) based on the total weight of the fuel. Fuels A, O, P, Q, R, and a fuel control as defined above were each subjected to the Shake Test procedure described in Example 1 and the Percent Foam Volume of each fuel was then calculated according to the procedure described in Example 1. The % foam volume and the break time for each fuel were then taken 1 day after fuel preparation and 4 days after fuel preparation and these values were then averaged. The results of the test are disclosed in Table 16 below.

TABLE 16

| Fuel | % Foam Volume | Break Time |
|---|---|---|
| FUEL CONTROL | +30% | 20 sec. |
| A | +6% | 19 sec. |
| O | +1% | 6 sec. |
| P | 0% | 0 sec. |
| Q | 0% | 0 sec. |
| R | +4% | 14 sec. |

Table 16 shows that the fuels containing the compounds of the instant invention had reduced foam volume and break time in comparison to prior art antifoam compounds and in comparison to the fuel control.

That which is claimed is:

1. A composition comprising:
   (A) a hydrocarbon fuel; and
   (B) an organopolysiloxane compound having its formula selected from
   (i) $RR^1R^2SiO(R_2SiO)_a(RR^1SiO)_b(RR^2SiO)_cSiRR^1R^2$,
   (ii) $RR^1R^2SiO(R_2SiO)_a(RR^2SiO)_cSiRR^1R^2$,
   (iii) $RR^1R^2SiO(R_2SiO)_a(RR^1SiO)_bSiRR^1R^2$, or
   (iv) $RR^1R^2SiO(R_2SiO)_aSiRR^1R^2$
   wherein R is a monovalent hydrocarbon group having from 1 to 20 carbon atoms, $R^1$ is R or a group having its formula selected from
   (v) $-R^3-O-(C_2H_4O)_d-(C_3H_6O)_e-R^4$,
   (vi) $-R^3-O-(C_2H_4O)_d-R^4$, or
   (vii) $-R^3-O-(C_3H_6O)_e-R^4$.

$R^2$ is R or a group having its formula selected from $$-R^3-O-(C_2H_4O)_d-(C_3H_6O)_e-C-CR^5R^6-CR^5R^6-COR^4, \quad \text{(viii)}$$

$$-R^3-O-(C_2H_4O)_d-C-CR^5R^6-CR^5R^6-COR^4, \text{ or} \quad \text{(ix)}$$

$$-R^3-O-(C_3H_6O)_e-C-CR^5R^6-CR^5R^6-COR^4 \quad \text{(x)}$$

wherein $R^3$ is a divalent hydrocarbon group having from 1 to 20 carbon atoms, $R^4$ is selected from a hydrogen atom, an alkyl group, or an aryl group, $R^5$ and $R^6$ are selected from a hydrogen atom or a group having the formula $-(C_nH_{2n+1})$ where n has a value from 1 to 30, a has a value from 1 to 1000, b has a value from greater than zero to 100, c has a value from greater than zero to 100, d has a value from greater than zero to 150, and e has a value from greater than zero to 150, with the proviso that there is at least one group having its formula selected from formula (viii), (ix), or (x) as defined above per molecule.

2. A composition according to claim 1, wherein the hydrocarbon fuel is diesel fuel.

3. A composition according to claim 1, wherein the hydrocarbon fuel is jet fuel.

4. A composition according to claim 1, wherein R is methyl.

5. A composition according to claim 1, wherein $R^3$ is selected from methylene, ethylene, propylene, butylene, trimethylene, 2-methyltrimethylene, pentamethylene, hexamethylene, 3-ethyl-hexamethylene, octamethylene, $-CH_2(CH_3)CH-$, $-CH_2CH(CH_3)CH_2-$, $-(CH_2)_{18}-$, cyclohexylene, phenylene, or benzylene.

6. A composition according to claim 1, wherein $R^5$ is selected from hydrogen, $-CH_3$, $-(C_2H_5)$, $-(C_3H_7)$, $-(C_4H_9)$, $-(C_6H_{13})$, $-(C_8H_{17})$, $-(C_9H_{19})$, $-(C_{10}H_{21})$, $-(C_{12}H_{25})$, $-(C_{14}H_{29})$, $-(C_{16}H_{33})$, $-(C_{18}H_{37})$, $-(C_{20}H_{41})$, or $-(C_{30}H_{61})$.

7. A composition according to claim 1, wherein $R^6$ is selected from hydrogen, $-CH_3$, $-(C_2H_5)$, $-(C_3H_7)$, $-(C_4H_9)$, $-(C_6H_{13})$, $-(C_8H_{17})$, $-(C_9H_{19})$, $-(C_{10}H_{21})$, $-(C_{12}H_{25})$, $-(C_{14}H_{29})$, $-(C_{16}H_{33})$, $-(C_{18}H_{37})$, $-(C_{20}H_{41})$, or $-(C_{30}H_{61})$.

8. A composition according to claim 6, wherein $R^6$ is selected from hydrogen, $-CH_3$, $-(C_2H_5)$, $-(C_3H_7)$, $-(C_4H_9)$, $-(C_6H_{13})$, $-(C_8H_{17})$, $-(C_9H_{19})$, $-(C_{10}H_{21})$, $-(C_{12}H_{25})$, $-(C_{14}H_{29})$, $-(C_{16}H_{33})$, $-(C_{18}H_{37})$, $-(C_{20}H_{41})$, or $-(C_{30}H_{61})$.

9. A composition according to claim 1, wherein $R^4$ is a hydrogen atom.

10. A composition according to claim 1, wherein $R^4$ is selected from methyl or ethyl.

11. A composition according to claim 1, wherein (B) is a compound having its formula selected from $Me_3SiO(Me_2SiO)_a(MeR^1SiO)_b(MeR^2SiO)_cSiMe_3$ or $Me_3SiO(Me_2SiO)_a(MeR^2SiO)_cSiMe_3$ wherein $R^1$ is a group having its formula selected from $-(CH_2)_3-O-(C_2H_4O)_d-(C_3H_6O)_e-H$ or $-(CH_2)_3-O-(C_2H_4O)_d-H$ and $R^2$ is a group having its formula selected from

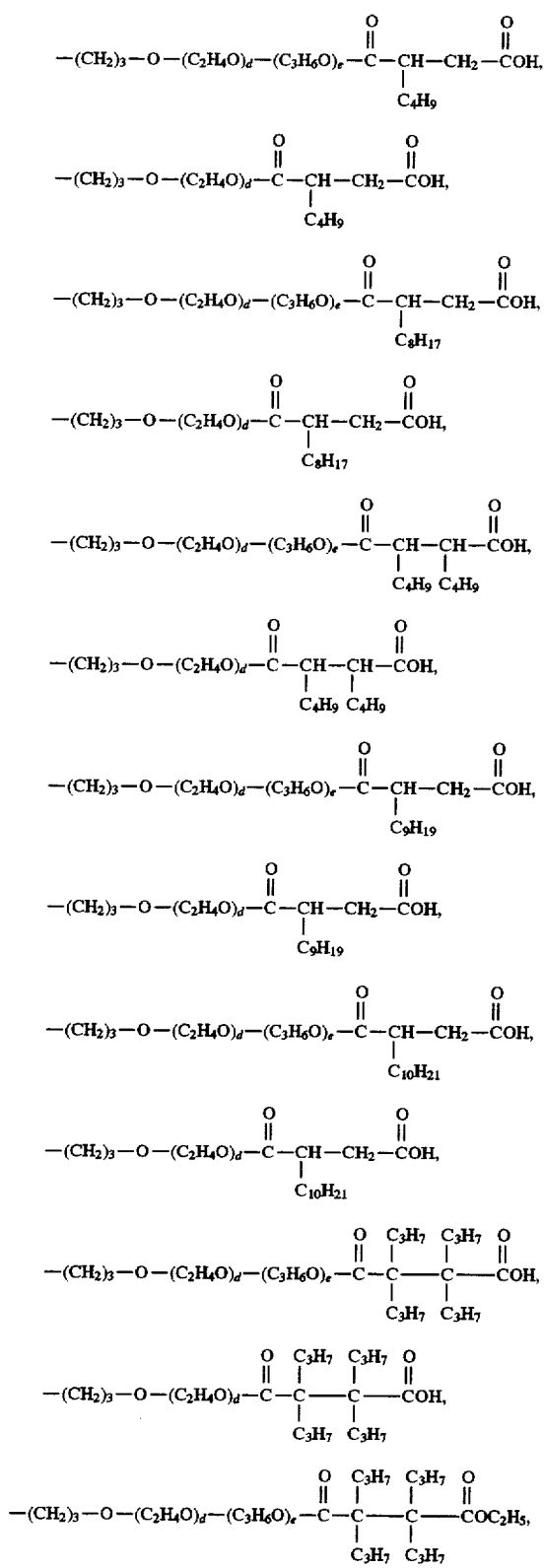
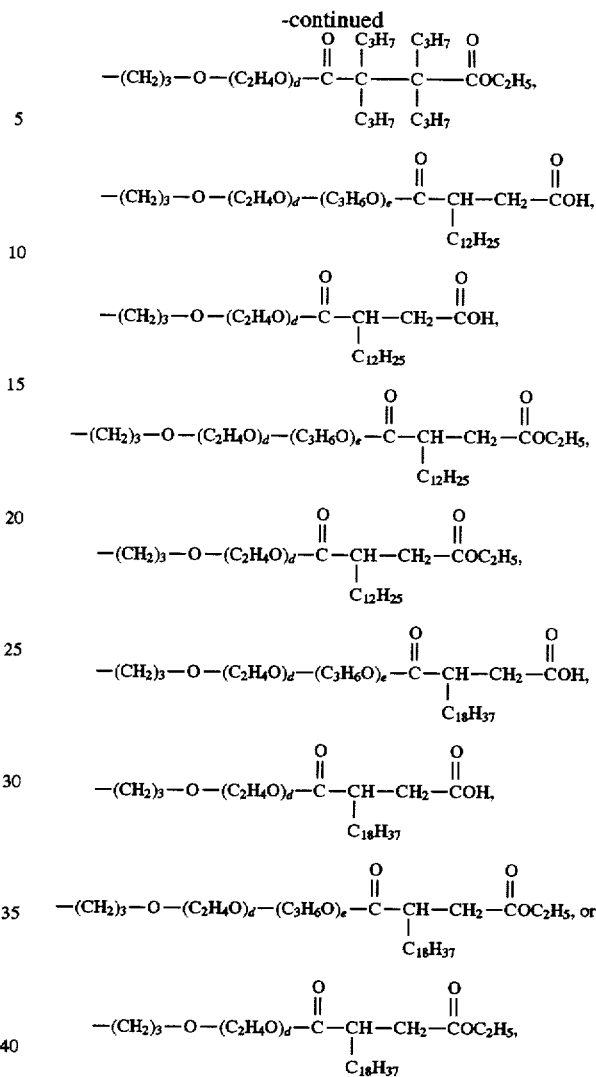

wherein Me denotes methyl, a has a value from 1 to 200, b has a value from greater than zero to 40, c has a value from greater than zero to 40, $R^3$ is an alkylene group having from 2 to 8 carbon atoms, d has a value from greater than zero to 50, and e has a value from greater than zero to 50.

12. A composition according to claim 1, wherein the composition further comprises at least one ingredient selected from corrosion inhibitors, anti-scaling agents, octane improvers, emulsifiers, detergents, demulsifiers, or drying agents.

13. A composition according to claim 1, wherein the composition further comprises a solvent selected from xylene, toluene, naphtha, ketones, esters, or ethers.

14. A composition according to claim 12, wherein the composition further comprises a solvent selected from xylene, toluene, naphtha, ketones, esters, or ethers.

* * * * *